United States Patent
Kara et al.

(10) Patent No.: US 9,676,003 B2
(45) Date of Patent: Jun. 13, 2017

(54) POSTAL SORTING MACHINE WITH ROBOTIZED HANDLING ARMS

(71) Applicant: Solystic, Bagneux (FR)

(72) Inventors: Karim Kara, Chabeuil (FR); Jacques Petit, Bourg les Valence (FR); Karine Crest, Etoile sur Rhone (FR); Pierre Campagnolle, Allex (FR); Eric Moullard, Portes les Valence (FR); Jean Rieu, Saint Georges les Bains (FR)

(73) Assignee: SOLYSTIC, Gentilly (FR)

( * ) Notice: Subject to any disclaimer, the term of this patent is extended or adjusted under 35 U.S.C. 154(b) by 77 days.

(21) Appl. No.: 14/441,454

(22) PCT Filed: Mar. 5, 2015

(86) PCT No.: PCT/FR2015/050541
§ 371 (c)(1),
(2) Date: May 7, 2015

(87) PCT Pub. No.: WO2015/145012
PCT Pub. Date: Oct. 1, 2015

(65) Prior Publication Data
US 2016/0256897 A1    Sep. 8, 2016

(30) Foreign Application Priority Data
Mar. 25, 2014   (FR) ...................................... 14 52530

(51) Int. Cl.
*B07C 1/02*      (2006.01)
*B07C 1/04*      (2006.01)
(Continued)

(52) U.S. Cl.
CPC .................. *B07C 1/04* (2013.01); *B07C 1/00* (2013.01); *B07C 1/06* (2013.01); *B65G 47/32* (2013.01); *B65G 47/90* (2013.01)

(58) Field of Classification Search
CPC .... B07C 1/02; B07C 1/04; B07C 3/02; B07C 3/04; B07C 3/08; B65G 47/14;
(Continued)

(56) References Cited

U.S. PATENT DOCUMENTS 4,634,328 A * 1/1987 Carrell ...................... B07C 1/04
198/444
4,692,876 A * 9/1987 Tenma ................. B65G 1/1371
414/791.6
(Continued)

FOREIGN PATENT DOCUMENTS

DE          102007038834         2/2009

OTHER PUBLICATIONS

French Search Report dated Dec. 10, 2014 for Application No. 14 52530.

*Primary Examiner* — Joseph C Rodriguez
(74) *Attorney, Agent, or Firm* — Patterson & Sheridan LLP

(57) ABSTRACT

A postal sorting machine includes a sorting conveyor having sorting outlets, a first feed branch adapted for automatically injecting heterogeneous postal articles of the small parcel type into the sorting conveyor, and a second feed branch adapted for injecting homogeneous flat mailpieces of the letter type, or the magazine type, or of some analogous type into the sorting conveyor. The first feed branch has an inlet adapted for receiving the heterogeneous postal articles loose, and it is provided with at least one robotized handling arm of the "pick and place" type.

10 Claims, 3 Drawing Sheets

(51) Int. Cl.
  *B07C 1/00* (2006.01)
  *B07C 1/06* (2006.01)
  *B65G 47/90* (2006.01)
  *B65G 47/32* (2006.01)

(58) Field of Classification Search
  CPC ........ B65G 47/32; B65G 47/74; B65G 47/90; B65G 47/907; B65G 47/91
  See application file for complete search history.

(56) References Cited

U.S. PATENT DOCUMENTS

| | | | | |
|---|---|---|---|---|
| 4,929,843 A * | 5/1990 | Chmielewski, Jr. | G01B 11/024 | 250/223 R |
| 5,065,237 A * | 11/1991 | Tsikos | B07C 1/02 | 209/586 |
| 5,348,440 A * | 9/1994 | Focke | B65G 61/00 | 414/792.9 |
| 5,501,571 A * | 3/1996 | Van Durrett | B65G 61/00 | 414/21 |
| 6,817,829 B2 * | 11/2004 | Kameda | B65G 61/00 | 414/789.6 |
| 7,414,218 B2 * | 8/2008 | Wheeler | B07C 3/02 | 198/370.01 |
| 9,333,649 B1 * | 5/2016 | Bradski | B25J 9/163 | |
| 2016/0199884 A1 * | 7/2016 | Lykkegaard | B07C 5/02 | 700/223 |

* cited by examiner

POSTAL SORTING MACHINE WITH ROBOTIZED HANDLING ARMS

TECHNICAL FIELD

The invention relates to the field of postal sorting and more particularly to the field of automatic postal sorting of mailpieces by means of a sorting conveyor that has sorting outlets and that is adapted for moving the mailpieces in series past the sorting outlets and for directing each mailpiece selectively towards a sorting outlet that corresponds to the postal address on the mailpiece.

PRIOR ART

Sorting machines are known that have sorting conveyors of the type having nipping belts for machine sorting of small-format flat mailpieces such as letters or the like.

Postal sorting machines are also known that have sorting conveyors of the bin carrousel type for machine sorting of mixed mail comprising flat mailpieces of small format, and flat mailpieces of larger format, such as magazines and the like.

Such machine-sortable mailpieces of small or large formats may, for example, have lengths lying in the range 140 millimeters (mm) to 380 mm, heights lying in the range 90 mm to 260 mm, and thicknesses lying in range 0.5 mm to 32 mm, with their weights lying in the range 10 grams (g) to 2 kilograms (kg). Such machine-sortable mailpieces may have paper envelopes, or have wrappers made of plastics material, or indeed be in banded bundles.

The range of postal articles delivered by the postal services also includes small parcels having very heterogeneous dimensions, weights, and packaging with values that can lie outside the range indicated above. For example, it is possible to have small parcels that are 100 mm in thickness and 5 kg in weight.

This type of heterogeneous postal article is sorted automatically in machines that are voluminous and that have low throughput rates. Small parcels are currently sorted separately from homogeneous flat mailpieces, which increases postal sorting costs.

SUMMARY OF THE INVENTION

An object of the invention is to propose a solution for increasing the range of postal articles that can be machine-sorted.

Another object of the invention is, in particular, to provide a solution for enabling both homogeneous flat mailpieces and also heterogeneous postal articles of the small parcel type to be sorted in the same automatic postal sorting machine.

Another object of the invention is to propose such a postal sorting machine that is compact and that has a small "footprint", i.e. that occupies only a small amount of floor area.

The basic idea of the invention is to feed the sorting conveyor in a postal sorting machine firstly with heterogeneous postal articles such as small parcels via a specific feed branch adapted to accommodate the physical specificities of such postal articles, and secondly with homogeneous flat mailpieces via another feed branch that remains conventional and adapted for homogeneous flat mailpieces.

To this end, the invention provides a feed branch serving to feed heterogeneous postal articles such as small parcels to a sorting conveyor having sorting outlets, said feed branch including an inlet adapted for receiving said heterogeneous postal articles, at least one robotized handling arm of the "pick and place" type adapted for taking the heterogeneous postal articles one-by-one and for placing them in series on a flat conveyor that moves them in series and flat along a certain conveyor path, image-taking means disposed along said conveyor path for the purpose of forming a digital image of each postal article that bears a postal address, and transfer means disposed at an end of said conveyor path for the purpose of transferring each postal article from the flat conveyor to the sorting conveyor, said feed branch being characterized in that it includes at least one first robotized handling arm that is adapted for singulating said heterogeneous postal articles and at least one second robotized handling arm that is adapted for putting said singulated postal articles in series and flat.

Such a specific feed branch for heterogeneous postal articles of the small parcel type may advantageously have the following features:

the second robotized handling arm is further adapted for orienting the heterogeneous postal articles in a longitudinal transport direction of the flat conveyor and for placing them in series and at constant pitch on the flat conveyor;

the first robotized handling arm has six degrees of freedom and said second robotized handling arm has four degrees of freedom;

each handling arm has a suction-cup pneumatic pick-up member;

the specific feed branch includes a circular flat conveyor between the inlet for receiving the postal articles and the robotized handling arm(s);

the transfer means are constituted by a tipper-platform carrousel having tipper platforms; and the image-taking means are disposed on two opposite sides of the flat conveyor so as to form two digital images of respective ones of two opposite sides of each postal article.

The invention also provides a postal sorting machine capable of sorting two separate streams into the same sorting outlets, one of the streams being a stream of homogeneous flat mailpieces and the other being a stream of heterogeneous postal articles.

More particularly, the invention provides a postal sorting machine including a sorting conveyor having sorting outlets, said postal sorting machine being characterized in that it includes a first feed branch adapted for automatically injecting heterogeneous postal articles into the sorting conveyor, and a second feed branch adapted for injecting homogeneous flat mailpieces into the sorting conveyor.

This postal sorting machine may also have the following features:

the sorting conveyor is a bin conveyor with bins that circulate around a closed-loop path;

each of the bins of the bin conveyor has a long dimension oriented transversely to the circulation direction in which the bins circulate around the closed-loop path; and each of the sorting outlets of the sorting conveyor is provided with a sorting outlet receptacle in which sorted homogeneous flat mailpieces are placed flat with sorted heterogeneous postal articles.

The invention also provides a method of sorting homogeneous flat mailpieces of small or large format such as letters or magazines with heterogeneous postal articles such as small parcels in a postal sorting machine as defined above, which method consists in loading the inlet of the specific first feed branch with heterogeneous postal articles in a loose pile, and in loading the second feed branch with homogeneous mailpieces placed in a stack and on edge.

Another feature of the sorting method is that the specific feed unit specifically for heterogeneous postal articles is controlled in such a manner that said heterogeneous postal articles are put in series on said flat conveyor at a constant pitch.

An embodiment of the invention is described below with reference to the drawings.

DESCRIPTION OF EMBODIMENTS

Figure 1:
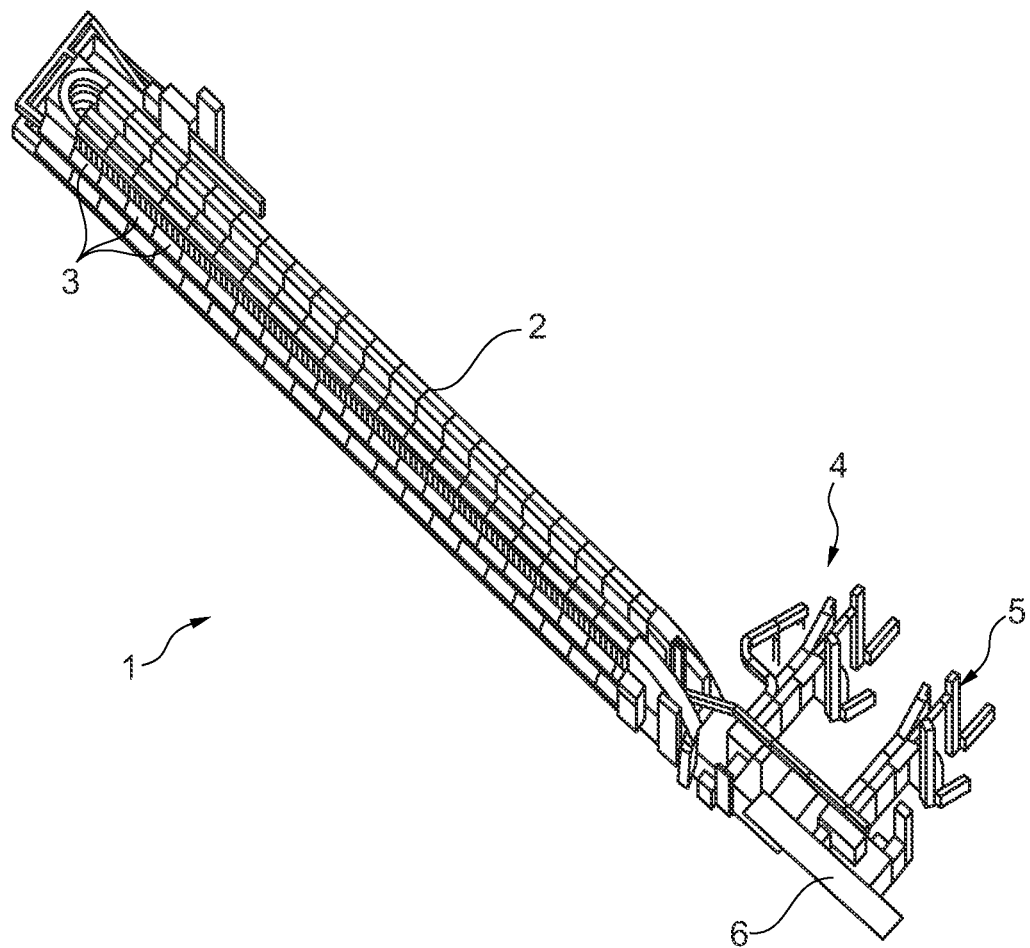
FIG. 1 is a diagrammatic perspective view of a postal machine of the invention.

FIG. 1 shows a postal sorting machine 1 of the invention seen overall and, in this example, including a sorting conveyor 2 of the bin carrousel type.

The bin carrousel 2 has bins (not shown in FIG. 1 but that can be seen in FIG. 4), each of which is adapted for conveying at least one postal article, which, in this example lying within the ambit of the invention, is a flat mailpiece or a small parcel.

The bins of the carrousel 2 circulate around a closed-loop path above sorting outlet receptacles 3 that, in this example, are removable trays in which the sorted articles can be placed in superposed manner flat.

FIG. 1 diagrammatically shows two feed branches 4, 5 that, in parallel, feed the bin carrousel 2 with homogeneous flat mailpieces of small and/or large format as is known to the person skilled in the art. These flat mailpieces may, for example, be letters, magazines, or the like.

In FIG. 1, reference 6 designates a specific feed branch of the bin carrousel 2, which branch is specifically for heterogeneous postal articles such as small parcels.

The sorting machine 1 is thus suitable for sorting into its sorting outlets 3 a stream of small parcels and a stream of mail, i.e. flat mailpieces, thereby making it possible to optimize postal sorting costs.

Since the packaging and the characteristics of small parcels are different from the packaging and the characteristics of mail, each feed branch has its own point of injection into the bin carousel.

Each of the feed branches 4 and 5 conventionally includes: an inlet magazine in which the flat mailpieces are disposed in a stack and on edge; an unstacker downstream from the magazine, which unstacker unstacks the flat mailpieces and puts them into series, a conveyor having nipping belts that conveys the flat mailpieces in series and on edge at constant spacing or pitch past a camera; and finally an injector that injects each flat mailpiece into a bin of the carrousel.

As is known, the camera forms a digital image of the face of each mailpiece that bears a postal address and more particularly the postal address to which the mailpiece is to be delivered, and, on the basis of optical character recognition (OCR) of the delivery address in the image, a control unit of the machine determines the sorting outlet 3 into which the mailpiece should be put by the bin carrousel.

Figure 2:
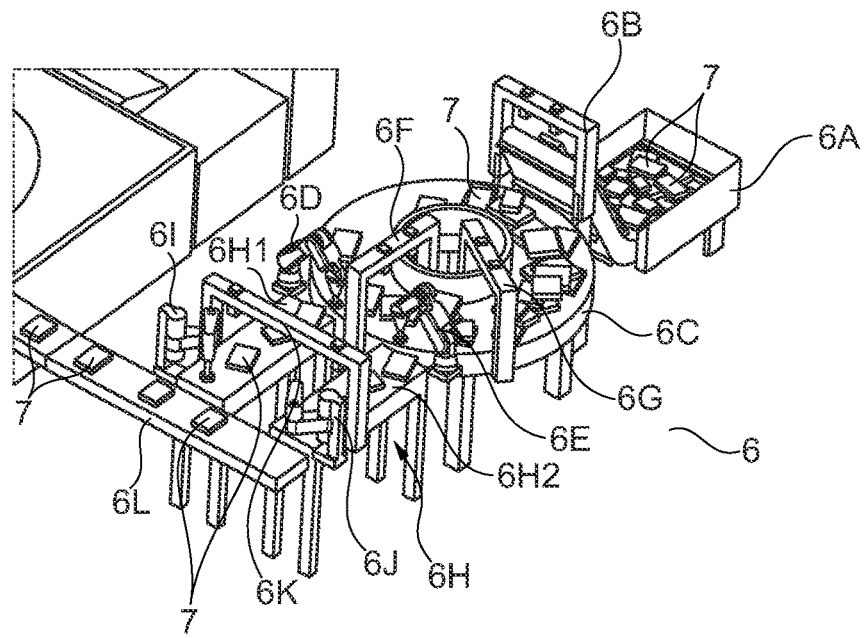
FIG. 2 is a diagrammatic perspective view of an upstream portion of an automatic feed branch for heterogeneous postal articles.

FIG. 2 is a more detailed view of the feed branch 6 that is specifically for heterogeneous postal articles 7 such as small parcels.

It has an inlet that, in this example, is formed by a sort of hopper 6A into which the heterogeneous postal articles 7 are poured in loose manner.

The heterogeneous postal articles 7 in a loose pile in the hopper 6A are separated to some extent mechanically by means of a belt conveyor 6B that forms the floor of the hopper 6A and that transports the postal articles 7 up a slope to vertically above a circular flat conveyor 6C.

The equipment 6A, 6B, 6C makes it possible to separate the heterogeneous postal articles 7 to an initial extent.

The postal articles 7 that fall onto the circular conveyor 6C are then singulated and put in series by means of at least one robotized handling arm of the "pick and place" type.

In FIG. 2, the feed branch 6 preferably has a first stage of robotized handling arms, namely two robotized arms 6D, 6E in this example, having six degrees of freedom and associated with respective ones of three-dimensional (3D) vision systems 6F, 6G.

The function of this first stage of robotized arms with vision systems is to singulate the heterogeneous postal articles 7 that are still partially piled up on the circular conveyor 6C by picking them up one-by-one and by placing them individually one behind another on one end of a flat conveyor 6H.

The circular conveyor 6C recycles the postal objects 7 that have not been picked up by the robotized arms 6D, 6E. Each robotized arm 6D, 6E may be equipped with a suction-cup pneumatic pick-up system.

As shown in FIG. 2, in this example the flat conveyor 6H has two tracks 6H1, 6H2 that are served by respective ones of the robotized arms 6D, 6E that can thus have different pick-and-place rates.

In this example, the feed branch 6 has a second stage of robotized handling arms that are disposed at the other end of the flat conveyor 6H downstream from the arms 6D, 6E, with, in this example, two other robotized arms 6I, 6J associated with a vision system 6K.

In this example, the robotized arms 6I, 6J are robotized arms having four degrees of freedom, with, for example, suction-cup pneumatic pick-ups, for picking the postal articles flat from respective ones of the tracks 6H1, 6H2 and for placing them flat and in series on the floor of another flat conveyor 6L that is adjacent to the conveyor 6H. In the example, the conveyor 6L is disposed perpendicularly to the conveyor 6H, thereby limiting the footprint of the postal sorting machine because the conveyor 6L can be extend in line with the sorting outlets 3 of the machine.

In this arrangement of industrial robotized arms mounted at fixed points, the function of singulation is thus separated from the function of putting into series, thereby making it possible to obtain maximum compactness for the feed unit 6, in particular because of the flexibility with which the flat conveyor 6H can be retro-fitted to installations that already exist.

The second stage of robotized arms 6I, 6J may also be adapted to orient the heterogeneous postal articles 7 in the "landscape" orientation, so that their long dimension extends perpendicularly to the longitudinal direction of the flat conveyor 6L. The robotized handling arms of the second stage of robotized arms can then synchronize at constant pitch the heterogeneous postal articles put in series.

Figure 3:
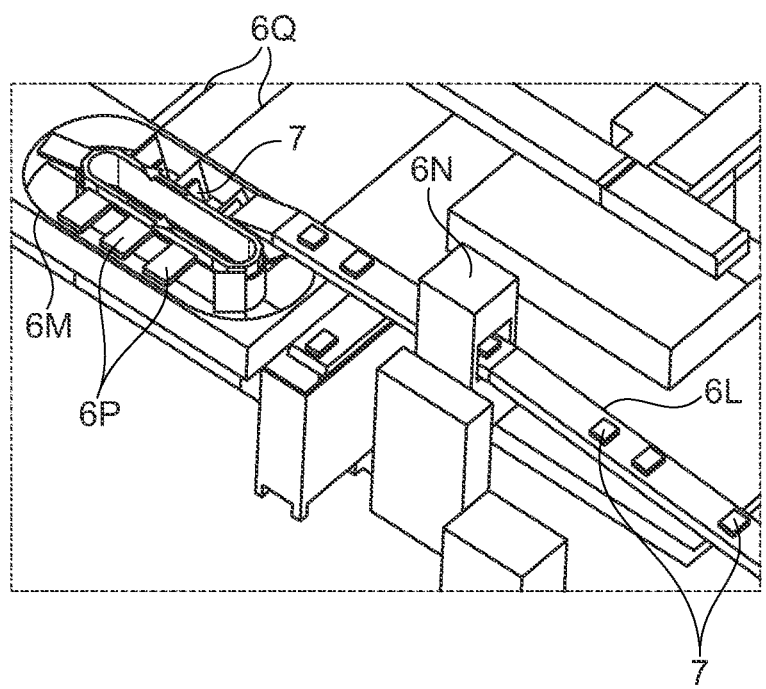
FIG. 3 is a diagrammatic perspective view of a downstream portion of the feed branch of FIG. 2.

FIG. 3 shows the downstream portion of the feed branch 6 with the flat conveyor 6L that transports the postal articles 7 in series, flat, and at a constant pitch towards a carrousel 6M having tipper platforms that serve to inject the heterogeneous postal articles 7 into the bins of the bin carrousel 2.

As can be seen in FIG. 3, an image-taking system 6N is disposed in the path of the conveyor 6L and on two opposite sides of it (above and below) to form two digital images of respective ones of the two opposite sides of each heterogeneous postal article 7. On the basis of one of said two digital images, the control unit can thus assess in the selected image a delivery address for the postal article so as to control the sorting conveyor in such a manner as to direct said heterogeneous postal article into a corresponding sorting outlet tray.

Figure 4:
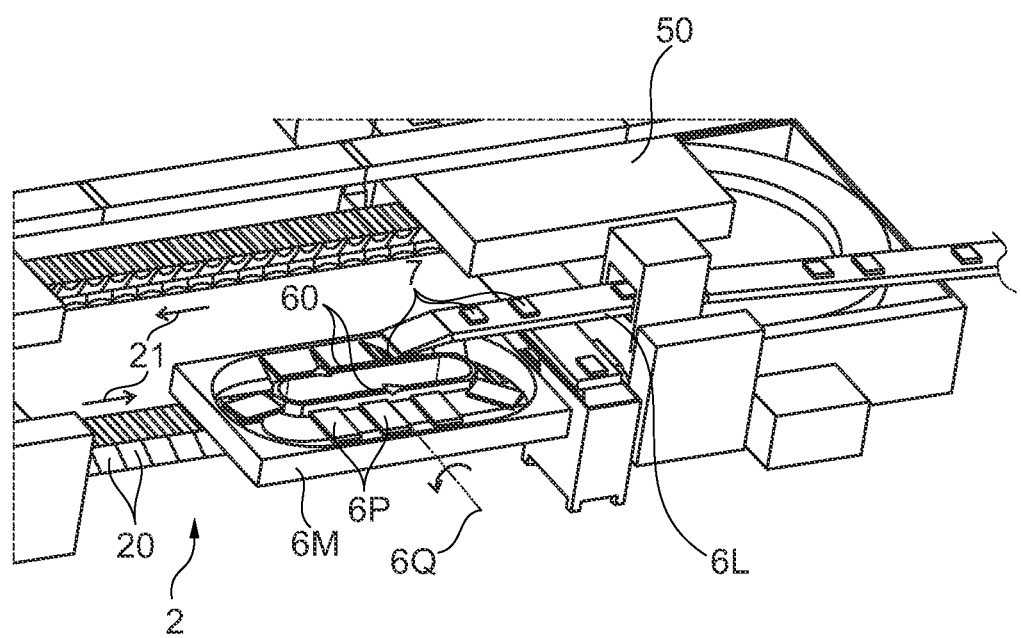
FIG. 4 is a diagrammatic view from another perspective of the downstream portion of the feed branch of FIG. 2 with the bins of a bin conveyor.

FIG. 4 shows that the tipper-platform carrousel 6M has platforms 6P that, in this figure, are in a horizontal position, and each of which is mounted to tilt about a pivot axis 6Q situated in the vicinity of the front side of the platform. At the end of the tilting movement towards the inclined position, each platform is brought back up automatically into the horizontal position by a ramp system.

The platforms 6P circulate in synchronized manner with the bins 20 of the bin conveyor 2, over a closed-loop path in the direction indicated by the arrows 60 above the bins 20 of the bin conveyor 2. In the example, the closed-loop path of the carrousel 6M has a length of about six meters (m) and the carrousel 6M has eleven platforms 6P that are of rectangular shape, e.g. of size 300 mm by 500 mm, that are moved at the same speed of about 1 meter per second (m/s) as the bins 20 and in the same circulation direction 21 as the circulation direction 21 of the bins.

Each platform of the carrousel 6M is loaded with a heterogeneous postal article 7 that is placed flat on the platform, which is in the horizontal position. The postal articles 7 arrive one-by-one on the platforms of the conveyor 6M via a sloping free end of the flat conveyor 6L, which is vertically above the platform conveyor and more particularly vertically above a rectilinear portion along which the platforms of the carrousel 6M circulate.

As shown in FIG. 4, the tilt axis 6Q of each of the platforms of the platform-carrousel extends transversely to the circulation loop of the platforms, and each of the bins 20 of the bin carrousel has a long dimension of about 400 mm (corresponding to the long dimension of the mailpieces) that is oriented transversely to the circulation loop 21 around which the bins circulate.

In the inclined position in which each platform 6P is tilted at an angle A of about 60° relative to the vertical, as shown in FIG. 5, its rear side, in the circulation direction 60, dips into a bin 20 that is also inclined relative to the vertical.

In this way, the postal article 7 on the tilted platform 6P is transferred by gravity and merely by sliding into the bin 20 that is moving in the same circulation direction 21 and in which it is stored substantially on edge on its side that is of the long dimension.

In FIG. 5, it can be seen that the tilt axis 6Q is disposed at the front of the platform, in the circulation direction 60 in which the platform is circulating. In accordance with the invention, the axis 6Q is disposed at a distance L2 relative to the front of the platform 6P, in the circulation direction 60, that lies in the range ⅕ and ⅓ of the length L1 (about 500 mm in this example) of the platform in said circulation direction. Trials have shown that a distance L2 equal to ¼ of L1 is a good compromise for obtaining the largest range of positions for placement on the platform for articles 7 of the entire range of postal mail including homogeneous mailpieces and heterogeneous postal articles.

The top surfaces of the platforms on which the articles 7 are placed have a coefficient of friction that is chosen to increase the range of positions in which the articles 7 can be placed by slightly delaying the time at which the articles slide while the platform 6P is tilting into the inclined position. In addition, as shown in FIG. 6, the top surface of each platform 6P has parallel striations 22 that extend in the in direction indicated by arrow 60 and that prevent articles 7 wrapped in plastics material from being slowed down under a suction cup effect.

The top face of each platform is thus undulating, thereby enabling air to pass under the article 7 placed on the platform. The ratio of the width of a striation to the width of a trough lies in the range ⅒, thereby making it possible to prevent the suction cup effect while offering a sufficient amount of surface area for bearing the article 7.

The length L1 of the platform should enable the article to slide over the platform in such a manner that the bottom edge of the article reaches the bottom of the platform when the platform comes into abutment in its inclined position.

It should be noted that the control unit of the postal sorting machine controls the carrousel 6M so that the platforms of the carrousel 6M move synchronously with the bins 20 of the carrousel 2.

The point at which the heterogeneous postal articles 7 are injected into the carrousel 2 is thus situated at the platform carrousel 6M while the point at which the homogenous flat mailpieces are injected into the carrousel 2 is located at a different other place, e.g., as in this example, at the end 50 of the feed branch 5.

As appears in FIG. 4, the point of injection at which the heterogeneous postal articles are injected into the bin conveyor 2 is situated more particularly on a rectilinear portion along which the platforms of the platform conveyor 6M circulate, which portion is superposed on a rectilinear portion along which the bins 20 of the bin conveyor 2 circulate. The rectilinear portion along which the platforms circulate is about 2 m in length in this example.

In FIG. 4, bins 20 are shown that each have three loading compartments that are adjacent to one another in the circulation direction 21. Each compartment may be dimensioned to transport a homogeneous mailpiece or a heterogeneous postal article.

Provision may be made for each bin 20 to have a specific compartment for homogeneous flat mailpieces and a specific compartment for heterogeneous postal articles.

It is also possible to provide bins 20 in which these specific compartments are juxtaposed (disposed side-by-side in the direction perpendicular to the direction 21) without going beyond the ambit of the invention.

By way of example, the synchronization between the platform carrousel 6M of the specific branch 6 may be adjusted relative to the rate of advance of the bin carrousel 2 so as to have one heterogeneous postal article 7 to be injected every six consecutive bins 20 of the carrousel 2.

The invention claimed is:
1. A feed branch serving to feed heterogeneous postal articles to a sorting conveyor having sorting outlets, said feed branch comprising:
   an inlet adapted for receiving said heterogeneous postal articles,
   at least a first robotized handling arm adapted for singulating said heterogeneous postal articles by taking the heterogeneous postal articles one-by-one and placing the heterogenous postal articles in series on a flat conveyor that moves the heterogenous postal articles in series, a second robotized handling arm configured for putting the singulated heterogenous postal articles flat along a certain conveyor path, image-taking means disposed along said conveyor path downstream the first and second robotized arms on the conveyor path for the purpose of forming a digital image of each postal article singulated and laid flat respectively by said first and second robotized arms that bears a postal address, transfer means disposed at an end of said conveyor path for the purpose of transferring each postal article singulated and laid flat respectively by said first and second robotized arms from the flat conveyor to the sorting conveyor, and wherein the second robotized handling arm is configured for orienting the singulated heterogenous postal articles in a longitudinal transport direction of the flat conveyor and for placing the singulated heterogenous postal articles in series and at constant pitch on the flat conveyor.

2. The feed branch according to claim 1, wherein the first robotized handling arm has six degrees of freedom and said second robotized handling arm has four degrees of freedom.

3. The feed branch according to claim 1, wherein each handling arm has a suction-cup pneumatic pick-up member.

4. The feed branch according to claim 1, wherein the feed branch includes a circular flat conveyor between the inlet for receiving the postal articles and the first and second robotized handling arms.

5. The feed branch according to claim 1, wherein the feed branch the transfer means are constituted by a tipper-platform carrousel having tipper platforms.

6. The feed branch according to claim 1, wherein the image-taking means are disposed on two opposite sides of the flat conveyor so as to form two digital images of respective ones of two opposite sides of each postal article.

7. A postal sorting machine including the sorting conveyor having sorting outlets, said postal sorting machine being characterized in that it includes a first feed branch according to claim 1, adapted for automatically injecting heterogeneous postal articles into the sorting conveyor, and a second feed branch adapted for injecting homogeneous flat mailpieces into the sorting conveyor.

8. The postal sorting machine according to claim 7, wherein said sorting conveyor is a bin conveyor with bins that circulate around a closed-loop path.

9. The postal sorting machine according to claim 8, wherein each of the bins of the bin conveyor has a long dimension oriented transversely to the circulation direction in which the bins circulate around the closed-loop path.

10. The postal sorting machine according to claim 8, wherein each of the sorting outlets of the sorting conveyor is provided with a sorting outlet receptacle in which sorted homogeneous flat mailpieces are placed flat with sorted heterogeneous postal articles.

* * * * *